(12) United States Patent
Yomoda et al.

(10) Patent No.: US 8,115,327 B2
(45) Date of Patent: Feb. 14, 2012

(54) ADJUSTING VOLTAGE PROVIDED BY BATTERY WITHIN PORTABLE ELECTRONIC DEVICE

(75) Inventors: Tomonari Yomoda, Kanagawa (JP); Toshio Yoshida, Kanagawa (JP)

(73) Assignee: NEC Mobiling, Ltd., Kanagawa (JP)

( * ) Notice: Subject to any disclaimer, the term of this patent is extended or adjusted under 35 U.S.C. 154(b) by 354 days.

(21) Appl. No.: 12/447,085

(22) PCT Filed: Aug. 30, 2007

(86) PCT No.: PCT/JP2007/066874
§ 371 (c)(1), (2), (4) Date: May 8, 2009

(87) PCT Pub. No.: WO2008/050538
PCT Pub. Date: May 2, 2008

(65) Prior Publication Data
US 2010/0038916 A1    Feb. 18, 2010

(30) Foreign Application Priority Data
Oct. 26, 2006 (JP) .................. 2006-291549

(51) Int. Cl.
*F03B 13/00* (2006.01)
(52) U.S. Cl. ........................ 290/1 E; 290/1 R
(58) Field of Classification Search ............ 290/1 E, 290/1 R; 322/1
See application file for complete search history.

(56) References Cited

U.S. PATENT DOCUMENTS

| 5,880,532 A | * | 3/1999 | Stopher ................. 290/1 E |
| 6,619,449 B2 | * | 9/2003 | Liao ...................... 322/1 |
| 6,930,403 B2 | * | 8/2005 | Hartman et al. ........ 290/1 A |

FOREIGN PATENT DOCUMENTS

| JP | 1996167862 A | 6/1996 |
| JP | 1998023679 A | 1/1998 |
| JP | 1998052000 A | 2/1998 |
| JP | 1998262341 A | 9/1998 |
| JP | 2000023378 A | 1/2000 |
| JP | 2001189152 A | 7/2001 |
| JP | 2002281684 A | 9/2002 |
| JP | 2003204091 A | 7/2003 |
| JP | 3106592 U | 1/2005 |
| KR | 2006-25334 A | 3/2006 |

OTHER PUBLICATIONS

International Search Report for PCT/JP2007/066874 mailed Nov. 20, 2007.
Japanese Office Action for JP2006-291549 mailed May 13, 2008.
Korean Office Action for KR10-2009-7010758 dated Nov. 2, 2010.

* cited by examiner

*Primary Examiner* — Tho D Ta

(57) ABSTRACT

There is provided a portable electronic device capable of being immediately operated without the use of a battery even when the battery reaches exhaustion. An electricity generating unit 131 is embedded in the portable electronic device. The electricity generating unit 131 has a mechanism to pull out a pull line 113 wound around a pulley 135 to wind up a spiral spring 133 and a mechanism to transfer torque occurring when the spiral spring 133 is released and to rotate the motor at high speed. An output voltage from the motor 142 is adjusted and smoothed by a constant voltage circuit and is directly supplied as power to power consuming components. The portable electronic device connecting two flips can wind up the spiral spring 133 by opening and closing the two flips.

7 Claims, 11 Drawing Sheets

ADJUSTING VOLTAGE PROVIDED BY BATTERY WITHIN PORTABLE ELECTRONIC DEVICE

This application is the National Phase of PCT/JP2007/066874, filed Aug. 30, 2007, which is based upon and claims priority from Japanese Patent Application No. 2006-291549 filed Oct. 26, 2006.

TECHNICAL FIELD

The present invention relates to a portable electronic device and more particularly to the portable electronic device in which a contrivance is added to supply power.

BACKGROUND TECHNOLOGY

A portable electronic device such as a mobile phone, PHS (Personal Handy-phone System), PDA (Personal Digital Assistant), and small-sized personal computer is widely used.

In these portable electronic devices, there is a tendency that power consumption increases due to addition of various new functions and/or improvement of processing speed of a CPU (Central Processing Unit).

A secondary battery, owing to its improvement in performance, now have a longer life compared with before. However, according to such a circumstance in which a communication function continues to be used for a long time, the battery reaches exhaustion in a comparatively short time, for example, in one day. Once the battery reaches exhaustion, all functions of a portable electronic device become disabled.

In such a case, conventionally, if a consent for utility power or a cigar lighter socket of an automobile is available in a near place, a user approaches the place to connect an exclusive battery charger to the exhausted battery in order to charge the battery. Moreover, by ordinarily carrying a standby battery already charged and by replacing the exhausted battery with the standby battery, the trouble of battery exhaustion can be resolved.

However, a user does not always carry the exclusive battery charger or standby battery already charged. Though a device to feed power by housing a dry battery into a specified battery case and connecting the dry battery to a power terminal of a portable electronic device and a battery charger equipped with a hand handle or solar battery are available, unless the user always carry these battery chargers, it is impossible to resolve the trouble of battery exhaustion.

When the battery reaches exhaustion outdoors, if there is luckily a convenience store or an electrical appliance in a near place, a user can buy a disposable battery charger or a set of a battery case or battery in some cases. The products for saving an immediate situation are comparatively expensive and go to waste in the end. Moreover, if energy exhaustion occurs in a state where a user cannot charge a battery due to a large-scale disaster such as an earthquake or during mountain climbing, a user cannot buy such products, thus making it impossible to utilize the advantage of a user's possessing a mobile phone for communications in the case of emergency.

As described above, mobile phones for themselves ideally have a careful measure against the occurrence of the battery exhaustion from a viewpoint of prevention against disasters.

To solve this problem, a first proposal is disclosed (for example, Patent Reference 1) in which a spiral spring is mounted internally in a drum around which a thread is wound to rotate an electricity generation rotor to obtain power. According to the first proposal, by using a spiral spring, an operation to put threads in a reciprocating motion is repeated and the drum rotates when the thread moves in one direction. The rotation of the drum causes a rotor of a power generator which is engaged with a Dobo gear to generate electricity and the battery is charged.

According to the first proposal, the drum rotates during one directional motion out of the reciprocating motions of the thread and, therefore, its rotation becomes intermittent. Accordingly, the produced electrical energy is not allowed to be directly supplied to electrical appliances such as an electronic circuit. To solve this problem, in the first proposal, an output from the power generator is supplied to an battery. As a result, once the battery exhaustion occurs, supply of a considerable amount of electric energy is required to restore an output voltage of a battery to a normal value. To achieve this, it is necessary that the reciprocal motion of the thread is repeated a huge number of times for a long time. For example, a device supplying power generated by further turning a handle by hand and more effectively rotating a rotor of the power generator has been introduced commercially, however, due to the reason similar to the above, the restoration from the occurrence of the energy exhaustion to a battery-usable state is actually difficult.

A mobile phone is disclosed as a second proposal in, for example, Patent Reference 2 in which opening and closing torque of a foldable mobile phone is accumulated in a spiral spring and a string of piezoelectric elements serving as a continuous vibrating source is vibrated. According to the second proposal, every time the foldable mobile phone is opened and closed, rotation torque is accumulated in a spiral spring. The rotation torque continues to apply an up-and-down vibration to an unillustrated string of piezoelectric elements.

Patent Reference 1: Japanese Patent Application Laid-open No. 2001-189152 (Paragraph 0008, Paragraph 0011, FIG. 1)

Patent Reference 2: Japanese Patent Application Laid-open No. 2003-204091 (Paragraphs 0010 to 0014, FIG. 3)

DISCLOSURE OF THE INVENTION

Problems to be Solved by the Invention

The piezoelectric element has a very short length of time during which it discharges by using mechanical pressure. Therefore, pulse-like power generated by the piezoelectric element cannot be employed, as it is, to a circuit component. According to the second embodiment, a plurality of piezoelectric elements is prepared and an output from them is connected to a rechargeable battery to supply power. Therefore, as in the first proposal, when the battery exhaustion occurs, it is necessary to repeat the opening and closing of a foldable mobile phone many times. Moreover, an amount of an electric energy production per unit hour is very small and, therefore, unlike the case where a battery is charged by using an ordinary power source consent, a user has to wait for hours before a rechargeable battery becomes usable and the first conventional method is unsuitable to communications in the case of emergency at time of the battery exhaustion.

In respect of the above, an object of the present invention is to provide a portable electronic device which is capable of being operated immediately, even when the battery reaches exhaustion, without charging of its battery.

Means for Solving Problem

In the invention stated in Claim 1, a portable electronic device is provided with a spiral spring made of a band-like elastic body wound around spirally, an external force applying unit to apply an external force to wind up the spiral spring and to make the spiral spring accumulate mechanical energy, an electricity generating unit to generate electricity by torque occurring when the spiral spring is released, a power consuming component to receive power at a specified rated voltage, a constant voltage adjusting unit to adjust so that the power generated and supplied by the electricity generating unit has the specified rated voltage, and a voltage applying unit to apply the specified rated voltage adjusted by the constant voltage adjusting unit to the power consuming component.

That is, in the present invention, the portable electronic device has an electricity generating unit to generate electricity by torque occurring when the spiral spring is released and the electricity generated by the electricity generating unit is adjusted by the constant voltage adjusting unit so that the power generated and supplied by the electricity generating unit has the specified rated voltage. In other words, power generated by the electricity generating unit using torque is supplied to the constant voltage adjusting unit, which enables the power to be applied to power consuming components without the use of a rechargeable battery. As a result, even when battery exhaustion occurs, the portable electronic device can be immediately operated.

In the present invention, the portable electronic device is provided with a spiral spring made of a band-like elastic body wound around spirally, an external force applying unit to allow an external force to act to wind up the spiral spring and to make the spiral spring accumulate mechanical energy, an electricity generating unit to generate electricity by torque occurring when the spiral spring is released, a power consuming component to receive power at a specified rated voltage, a rechargeable battery embedded, a constant voltage adjusting unit to adjust so that the power generated and supplied by the electricity generating unit has the specified rated voltage, and a switch to selectively apply the specified rated voltage adjusted by the constant voltage adjusting unit and a voltage outputted from the rechargeable battery to the power consuming component.

That is, in the invention, unlike the invention stated in Claim 1, power generated when the spiral spring is released can be supplied to power consuming components with the rechargeable battery being set to a portable electronic device. Therefore, a switch is provided to selectively apply the specified rated voltage adjusted by the constant voltage adjusting unit and a voltage outputted from the rechargeable battery to the power consuming component. Moreover, the switch may be of a mechanical type and has a circuit configuration which can select and output a voltage outputted by the constant voltage adjusting unit when a voltage outputted by the constant voltage adjusting unit is higher than a voltage of the embedded rechargeable battery (Claim 2), thus realizing an excellent effect of being able to use time-divisionally either power supplied from the rechargeable battery or power generated when the spiral spring is released, whichever its voltage is higher.

Effects of the Invention

As described above, according to the present invention, electricity is generated by torque when the spiral spring is released and, therefore, unlike the solar battery, the portable electronic device such as a mobile phone can be operated for a specified period of time in an operation-free manner irrespective of a weather or day and night. Moreover, power adjusted by the constant voltage adjusting unit is supplied to power consuming components and, therefore, no charging of the rechargeable battery is required and the power can be used as a power supply. Further, a battery such as a standby battery for replacement and disposable battery charger is not used and, therefore, a portable electronic device can be used economically and does not become exhausted by secular changes and can be employed as a power source at any time. Additionally, waste does not occur during the operation of the portable electronic device, thus being ecologically friendly.

BRIEF DESCRIPTION OF DRAWINGS

FIG. 4(a) shows a state before the start of electricity generation, FIG. 4(b) shows a state where a pull line is withdrawn as much as possible by a user's hanging fingers (not shown) on an operating pull ring, and FIG. 4(c) shows a state where electricity is being generated.

FIG. 8 is a diagram explaining the state of rotation of the mobile phone according to the second embodiment of the present invention and FIG. 4(a) is a diagram showing the same state as in FIG. 7 and FIG. 8(b) is a diagram showing the state in which a first flip is rotated 270 degrees.

Figure 1:
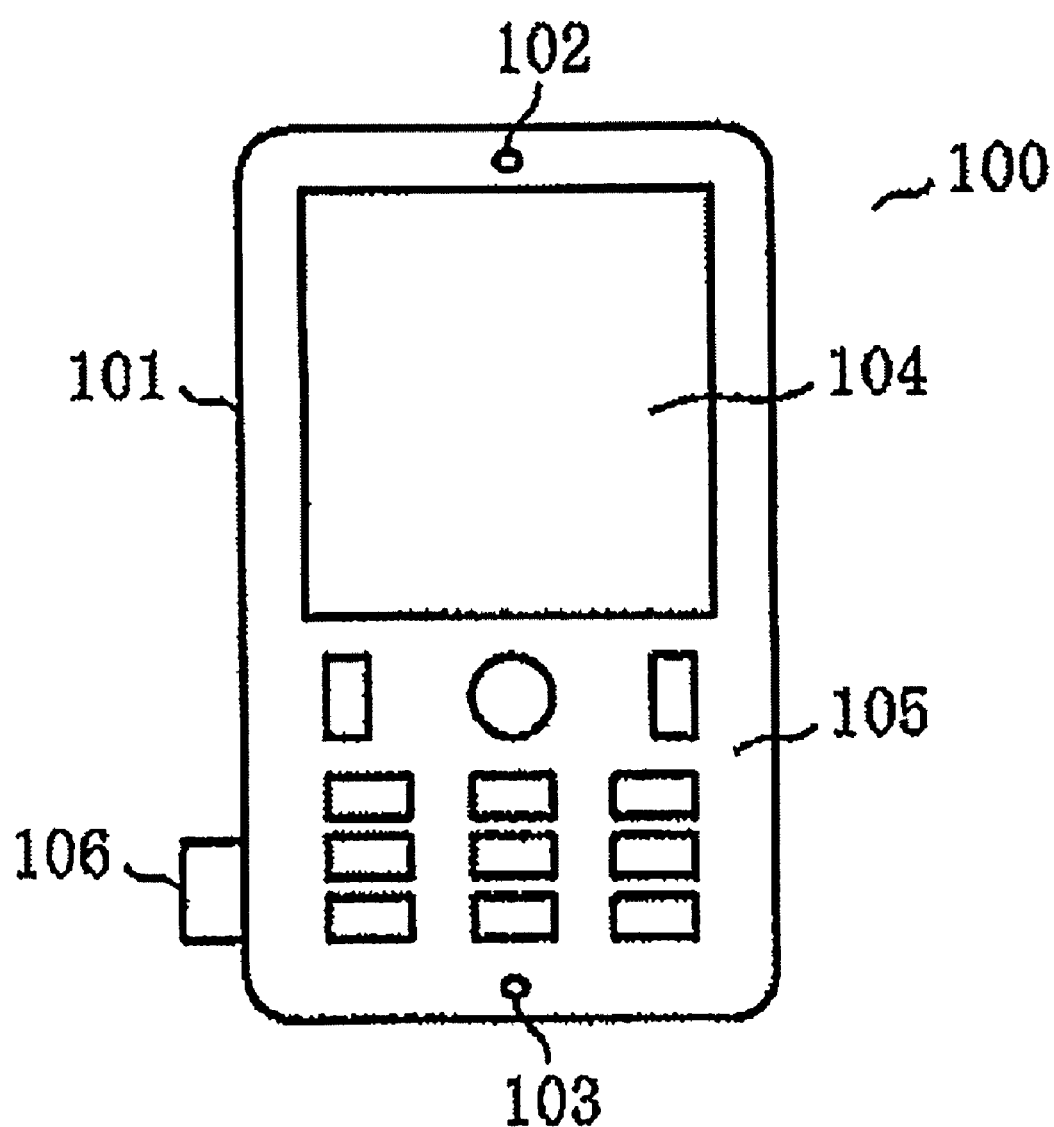
FIG. 1 is a front view of a mobile phone being a portable electronic device of a first embodiment of the present invention.

EXPLANATION OF LETTERS AND NUMERALS 100, 100A, 100B: Mobile phone
101: Main body
101A, 101B: First flip
102A, 102B: Second flip
106: Latch disengaging button
112: Operating pull ring
113, 113B: Pull line
131: Electricity generating unit
133: Spiral spring
135: Pulley
136, 136A: First gear
137: Second gear
138: Third gear
139: Fourth gear
141: Torque transferring plate
142: Motor 144, 144A: Latch mechanism
151: Rechargeable battery
152: Constant voltage circuit
153: Power consuming components
154: Switch circuit
212: First fitting portion
213: Securing portion
215: Second fitting portion
216: Power transferring axis
217: Rotor
218, 219: Teeth
251: Roller

BEST MODE OF CARRYING OUT THE INVENTION

Hereinafter, the embodiments of the present invention are described in detail.

First Embodiment

FIG. 1 shows a mobile phone 100 viewed from its front being one of portable electronic devices of the first embodiment of the present invention.

The portable phone 100 has a speaker 102 in the vicinity of the top end of a front of its main body 101 and a microphone 103 in the vicinity of the bottom end. Between the speaker 102 and microphone 103 are disposed a display 104 and an operating portion 105 made up of a liquid crystal or organic electroluminescence.

In a side portion of the main body 101 is disposed a latch disengaging button 106. The latch disengaging button 106 is a mechanical switch mounted to generate electricity while being pressed down. The latch disengaging button 106, when further pressed down while being pressed down, returns back to its original position by an unillustrated spring and gets into a latched state.

Figure 2:
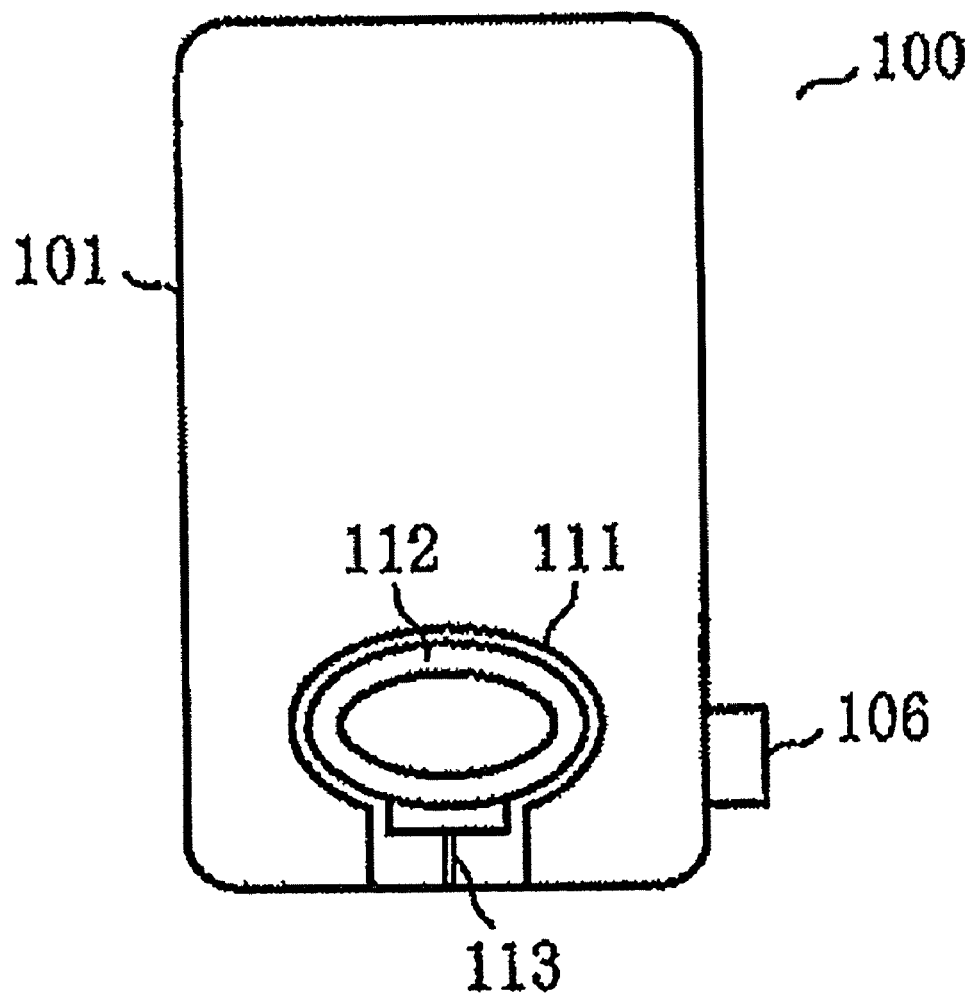
FIG. 2 is a rear view of the mobile phone according to the first embodiment of the present invention.

FIG. 2 shows the mobile phone 100 viewed from its rear.

On a rear of the main body of the mobile phone 100 is formed a keyhole-shaped concave portion 111 into which an operating pull ring 112 is fitted so as to be freely inserted and removed. The operating pull ring 112, when electricity is generated, is taken out from the main body 101 to move a pull line 113 attached to its end portion downward so that the pull line 113 is withdrawn in a downward direction in FIG. 2.

Figure 3:
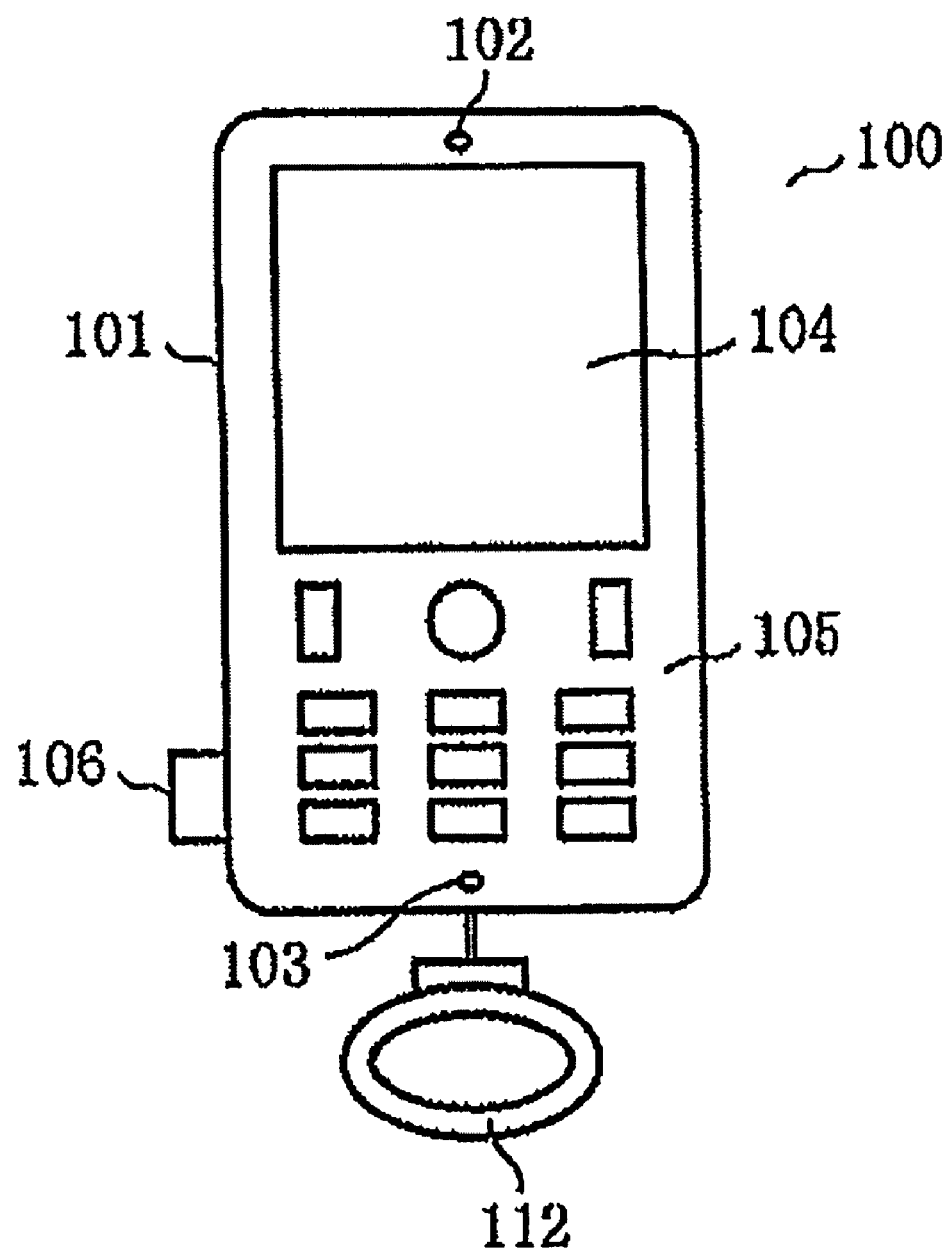
FIG. 3 is a front view showing a state where an operating pull ring is taken out from the mobile phone according to the first embodiment of the present invention.

FIG. 3 shows a state in which the operating pull ring 112 is taken out from the mobile phone 100.

The operating pull ring 112 is attached so as to hang down from the bottom end of the main body 101.

Figure 4:
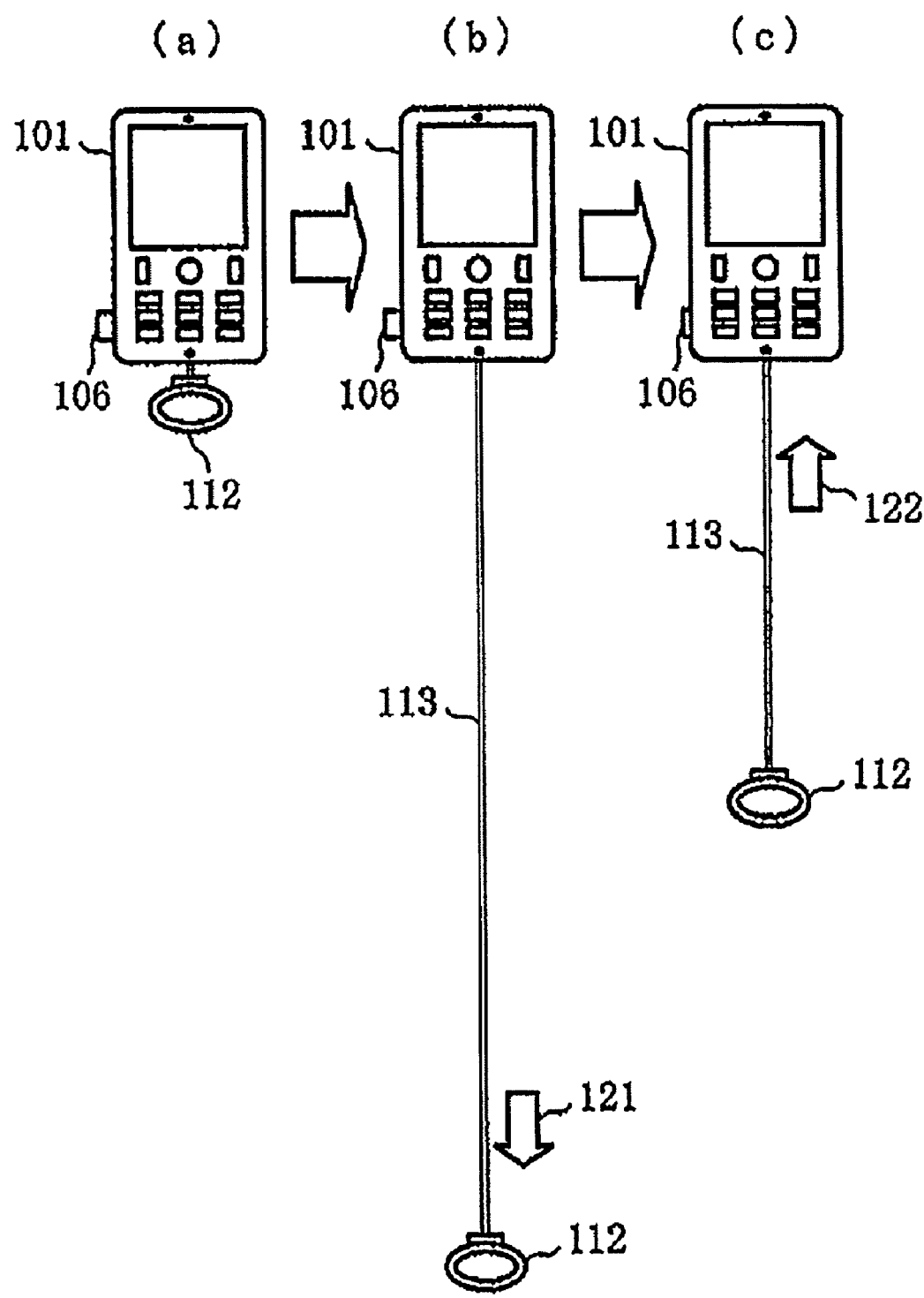
FIG. 4 is a diagram explaining procedures for electricity generation of the mobile phone according to the first embodiment of the present invention.

FIG. 4 shows procedures for electricity generation of the mobile phone 100.

FIG. 4(a) shows a state before the start of electricity generation which is the same state as in FIG. 3.

FIG. 4(b) shows a state where the pull line 113 is withdrawn as much as possible by a user's hanging fingers (not shown) on the operating pull ring 112. When the pull line 113 is withdrawn, the latch disengaging button 106 is pressed down and the latch is disengaged. After that, as shown in FIG. 4(b), the latch is engaged and the mobile phone 100 gets into a standby state for electricity generation. The longer the length of the pull line 113 to be withdrawn from the mobile phone 101 to a direction of an arrow 121 is, the longer the time during which electricity is being generated is.

FIG. 4(c) shows a state in which electricity is being generated. Since the latch disengaging button 106 has been pressed down, the pull line 113 moves slowly to the direction of the arrow 122. A user is allowed to suspend the electricity generation by returning the latch disengaging button 106 to its original state (state in FIG. 4(a) or in FIG. 4(b)). When the pull line 113 returns back to the state in FIG. 4(a), the electricity generation stops.

Figure 5:
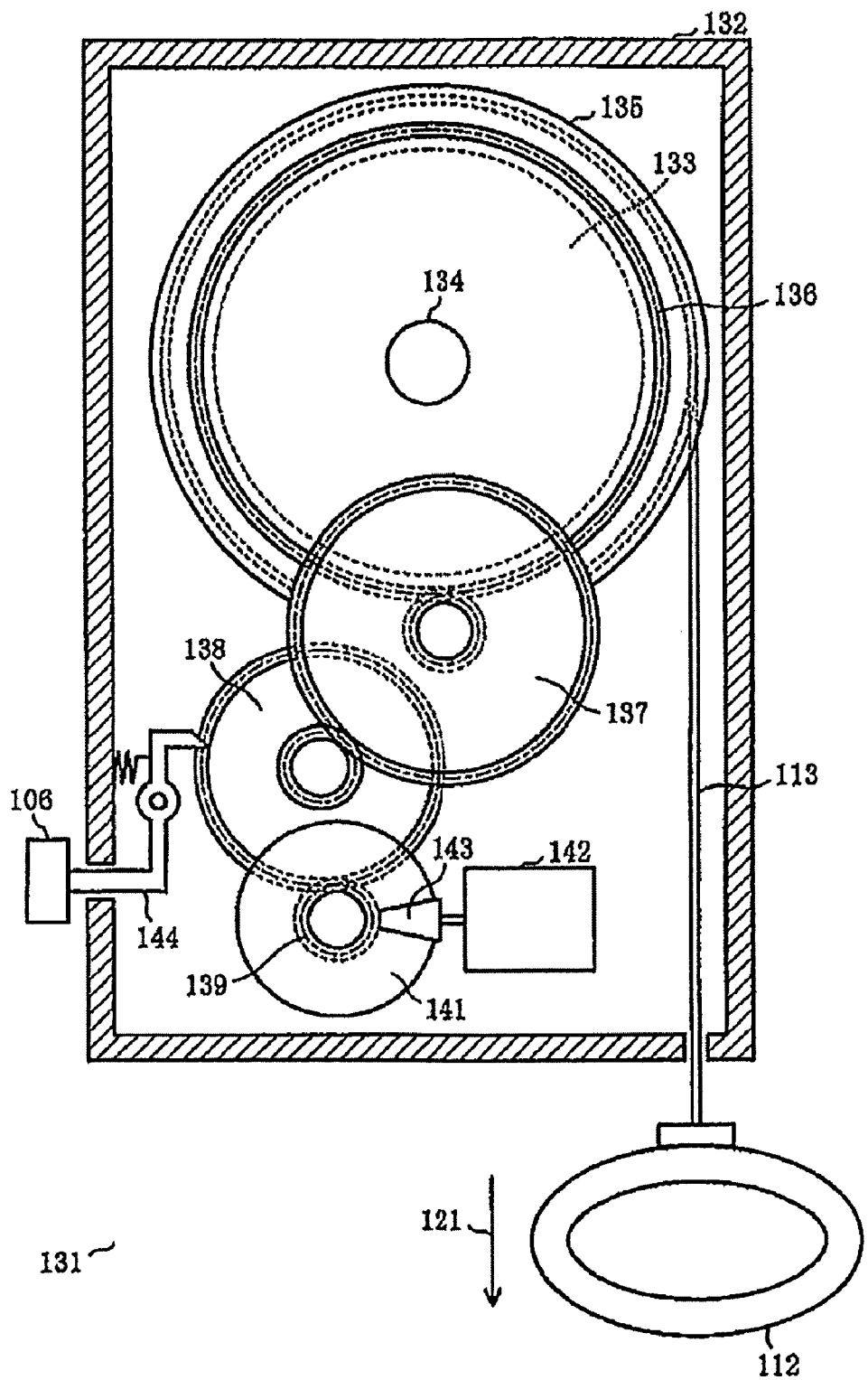
FIG. 5 is a diagram schematically showing an electricity generating unit housed in the main body of the mobile phone according to the first embodiment of the present invention.

FIG. 5 shows an electricity generating unit 131 housed in the main body 101

The electricity generating unit 131 is made up of a box-shaped case 132 in which a spiral spring 133, a pulley 135 attached to a rotation axis 134 to wind up the spiral spring 133, and a large-diameter first gear 136 attached integrally with the pulley 135. The pull line 113 is wound around the pulley 135.

The first gear 135 transfers power through the second to fourth gears 137, 138, and 139 to speed up each of the gears 137, 138, and 139.

A disk-like torque transferring plate 141 whose central portion is swollen is attached integrally with the fourth gear 139 and the surface of the torque transferring plate 141 is covered with a layer of rubber. To a rotation axis of the motor 142 for electricity generation is attached a conical rotor 143 which comes into contact with a surface of the torque transferring plate 141 in a state of being slid. This causes the rotation of the torque transferring plate 141 to be transferred to the motor 142.

In a convex and concave portion making up an external tooth of the third gear 138 is disposed a tip portion of a latch mechanism 144 (shown in principle) in a manner to be freely advanced and retreated. When the tip portion of the latch mechanism 144 is inserted into the concave portion making up the external tooth, the third gear 138 is latched to stop its rotation. When the latch disengaging button 106 is pressed down, the latch is disengaged, thus allowing the third gear 138 to be rotated.

Figure 6:
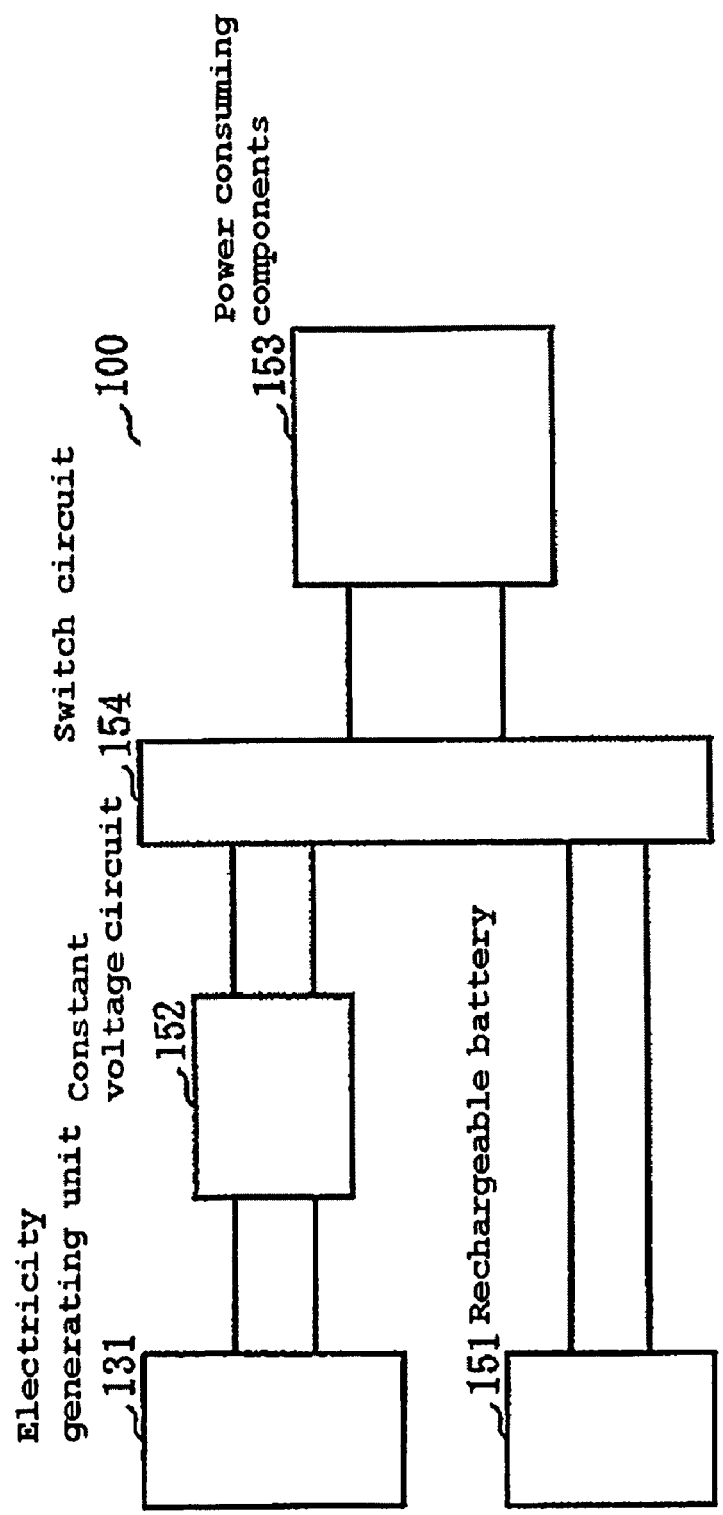
FIG. 6 is a block diagram schematically showing configurations of circuits of the mobile phone according to the first embodiment of the present invention.

FIG. 6 shows an outline of configurations of circuits of the mobile phone 100 of the embodiment.

The mobile phone 100 is provided with two systems as a power supply including the electricity generating unit 131 and a rechargeable battery 151.

An output from a motor 142 of the electricity generating unit 131 shown in FIG. 5 is inputted to a constant voltage circuit 152 and is smoothed by a smoothing circuit made up of circuit components such as a capacitor (not shown) so that ripples are removed from a DC current and is then adjusted to become a rated voltage of each power consuming component and is outputted to one input side of a switching circuit 154. The power consuming components 153 connected to an output side of the switching circuit 154 refer to unillustrated all circuits which consume power and include a control portion, communication circuit, or the like making up the mobile phone 100. The rechargeable battery 151 is connected to another input side of the switching circuit 154.

The switching circuit 154 may be made up of a mechanical switch. In the embodiment, when a voltage is applied from the constant voltage circuit 152, if the applied voltage is higher than an output voltage from the rechargeable battery 151, the output side of the switching circuit 154 is connected to the constant voltage circuit 152 and, in this state, the constant voltage circuit 152 is electrically disconnected to the rechargeable battery 151.

Power from the constant voltage circuit 152 is not supplied to the rechargeable battery 151 side at any time point. In the case where the switching circuit 154 is made up of a mechanical switch, it is essential only that either the constant voltage circuit 152 or the rechargeable battery 151 is allowed to be selectively connected to the power consuming components 153.

In the mobile phone 100 having the configurations as described above, the rechargeable battery 151 reaches exhaustion, the operating pull ring 112 is taken out from the concave portion 111 formed in a rear of the main body 101 shown in FIG. 2. Then, a user hangs fingers on the operating pull ring 112 as shown in FIG. 4(b) and pulls out the pull line 113, for example, as much as possible, with the latch disengaging button 106 being pressed. This causes the pulley 135 shown in FIG. 5 to be rotated to wind up the spiral spring 133.

Here, the user temporarily returns the state of the latch disengaging button 105 back to the latched state. Then, the user, after checking to confirm that there is no fear that the operating pull ring 112 or the pull line 113 gets snagged on something and making preparations for operations of the mobile phone 100 required for making a call or the like, manipulates the latch disengaging button 106 to disengage the latch. At the same time, the pulley 135 and the first to fourth gears 136 and 139 start to rotate and the electricity generating unit 131 begins generating electricity. Simultaneously, the pull line 113 move slowly to the direction of the arrow 122 shown in FIG. 3(c) and is wound up by the pulley 135.

In the embodiment of the present invention, when the pull line 113 is pulled out as much as possible, an output from the constant voltage circuit 152 is fed through the switching circuit 154 to the power consuming components 153 for several minutes. Therefore, the user is allowed to carry out a short conversation or to create and transmit or receive mail. In the case of processing mail, the processing may be divided into a plurality of portions, for example, the mail may be created at the first stage and then, after the pull line 113 is again pulled out as much as possible, the mail may be transmitted and received.

In the embodiment explained as above, at the same time when electricity generation starts, the pull line 113 is wound up by the main body 101, which changes a length of the pull line 113. Therefore, the user can easily confirm, by checking the length, residual time during which power can be supplied.

In the configurations of the embodiment, the power consuming components 153 refer to all the circuits making up the mobile phone 100, however, the power consuming components may be divided into circuit portions that enable a minimum level of communications and other circuit portions and may be configured so that an output from the constant voltage circuit 152 is supplied through the switching circuit 154 only to the circuit portions that enable the minimum level of communications. This makes it possible to reliably supply power for a long time which is required for communications in the case of emergency.

Moreover, in the embodiment, the operating pull ring 112 is pulled out only one time to generate electricity, however, the spiral spring 133 may be wound up little by little by pulling the operating pull ring 112 a plurality of times using the ratchet mechanism. In this case, a spiraling preventing latch may be mounted so that, at the time when the spiral spring 133 is sufficiently wound up, even if the operating pull ring 112 is pulled out excessively, the spiral spring 133 is not allowed to be wound up.

Second Embodiment

Figure 7:
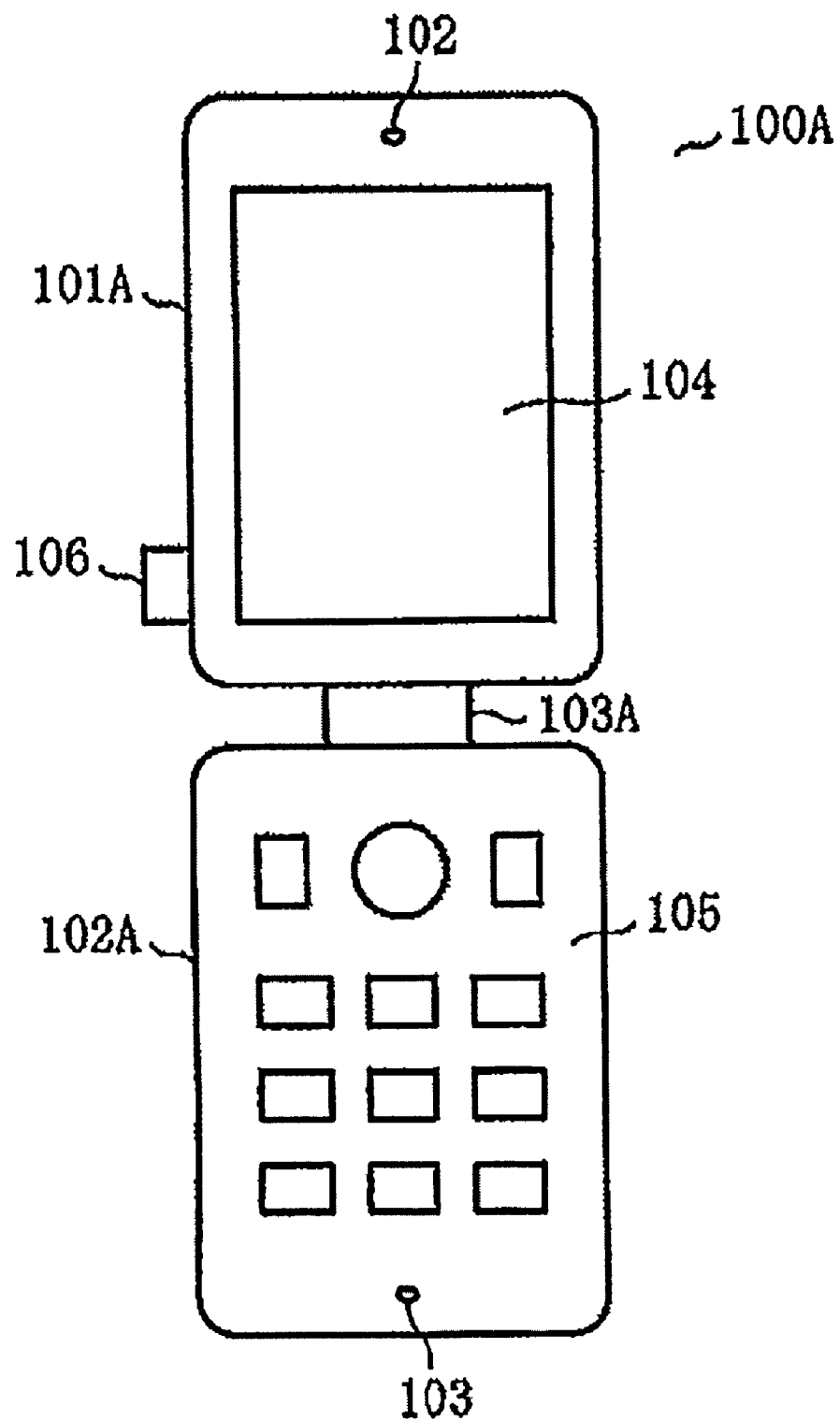
FIG. 7 is a front view showing a mobile phone according to a second embodiment of the present invention.

FIG. 7 shows a mobile phone of the second embodiment of the present invention.

In FIG. 7, same reference numbers are assigned to components having the same function as in FIG. 1 and their descriptions are omitted accordingly.

In the mobile phone 100A of the second embodiment, a first flip 101A is connected to a second flip 102A through a hinge mechanism 103A, thus providing a foldable mobile phone 100A. In the side portion of the first flip 101A is attached a latch disengaging button 106. When the latch disengaging button 106 is pressed with the mobile phone 100A being fully opened as shown in FIG. 1, the first flip 101A and second flip 102A are rotated pivotally around the hinge mechanism 103A.

Figure 8:
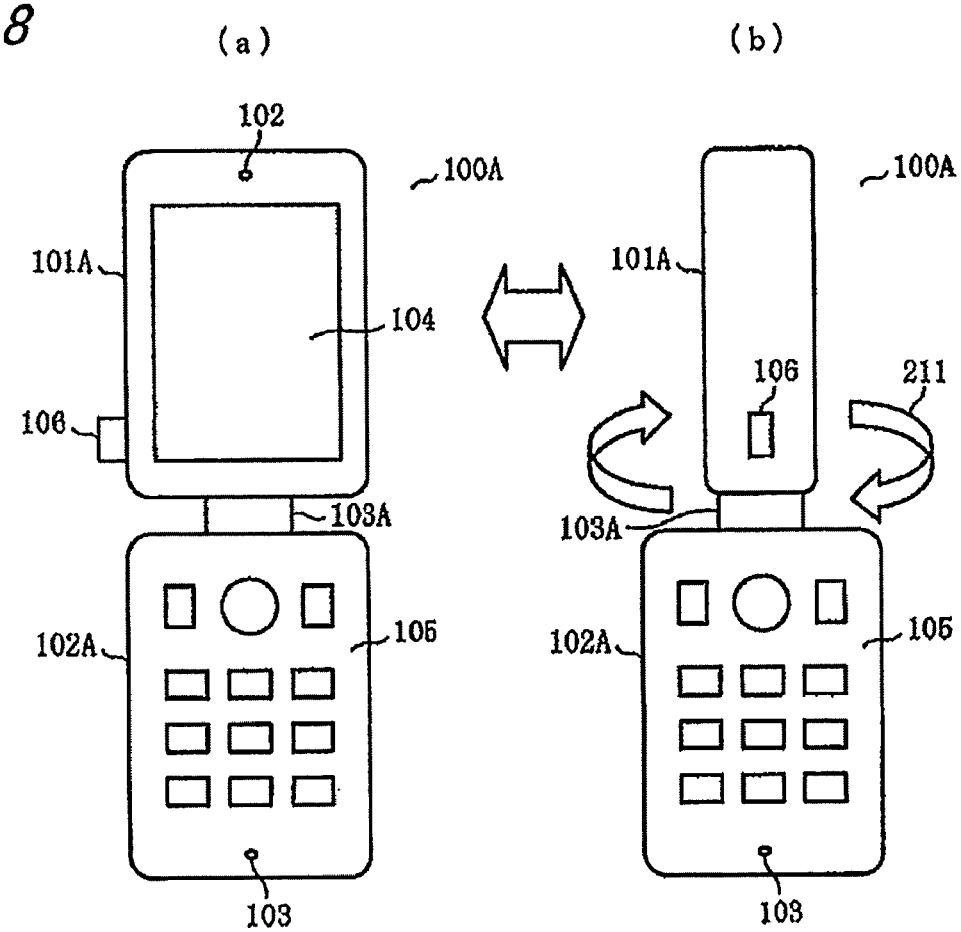

FIG. 8 shows a state of rotation of the mobile phone 100A.

FIG. 8(a) shows the same state as in FIG. 7 and FIG. 8(b) shows the state in which the first flip 101A is rotated 270 degrees. The first flip 101A can be rotated in a direction of the arrow 211 a plurality of times and, by this rotation, the spiral spring in the first flip 101A is wound up.

Figure 9:
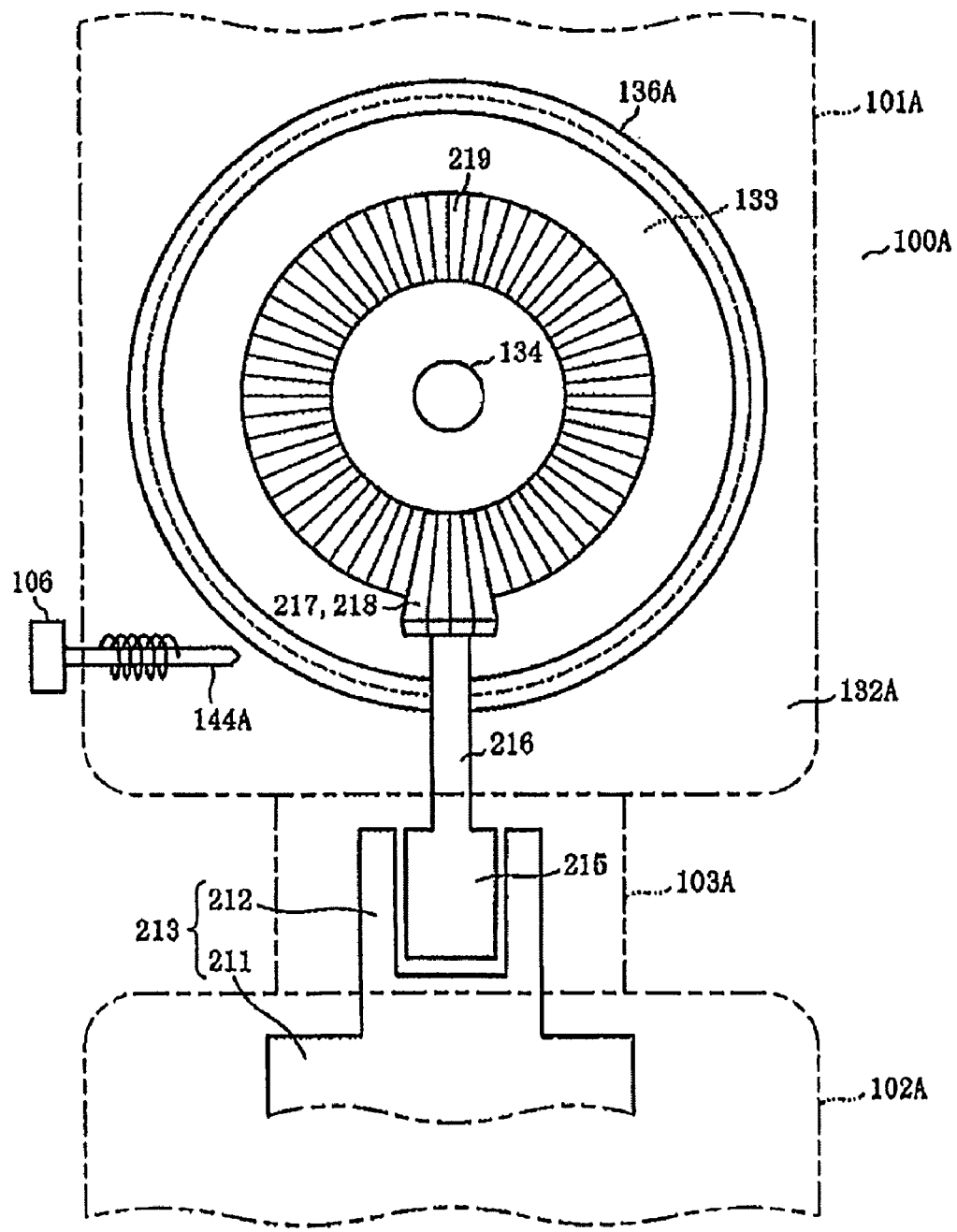
FIG. 9 is a diagram showing principles of a main portion of an electricity generating unit according to the second embodiment of the present invention.

FIG. 9 shows the operating principle of a main portion of a electricity generating unit of the second embodiment.

The electricity generating unit 132A is made up of a securing portion 213 having a base portion 211 secured to the second flip 102A and a first concave-shaped fitting portion 212 protruded in the hinge mechanism 103A and of a power transferring axis 216 having a second fitting portion 215 which is fitted into the first fitting portion 212 to be rotated at the same time when the first flip 101A rotates around the hinge mechanism 103A while the mobile phone 100A is fully opened as shown in FIG. 7.

At another end of the power transferring axis 216 is formed a conical rotor 217. Teeth 218 are carved in a circumferential portion of the rotor 217 and these teeth 218 engage with teeth 219 concentrically and radially formed on the plate surface of a large-diameter first gear 136A which winds up the spiral spring 133. When the first flip 101A is rotated around the hinge mechanism 103A in a specified direction, the first gear 136A rotates around the power transferring axis 216 and, at the same time, the first gear 136A rotates around the rotation axis 134 to wind up the spiral spring 133.

Latching is performed by engaging the latch mechanism 144A connected to the latch disengaging button 106 with the teeth of the first gear 136A or with unillustrated convex and concave portions disposed nearer to a central position and latching is cancelled by disengaging the latch mechanism 144 from the teeth or the convex and concave portions. Moreover, in the state where the latch is disengaged and the spiral spring 133 is released, other teeth are rotated, as shown in FIG. 5, by the rotation of the first gear 136A and the electricity generating motor 41 shown in FIG. 5 generates electricity.

Moreover, in the mobile phone 100A of the embodiment, the first flip 101A rotates around the hinge mechanism 103A in the same direction as the second flip 102A is rotated, however, its rotation speed is slow. Therefore, the rotation causes no big failure in operations. It is needless to say that a contrivance can be added to the configuration of the mobile phone 100A so that the first flip 101A is not rotated by the motion of the second flip 102A.

Also, in the mobile phone 100A of the second embodiment, the spiral spring 133 is wound up by allowing the first flip 101A to be rotated a plurality of times in the same direction as the second flip 102A, however, the spiral spring 133 may be wound up sequentially and intermittently by making a ratchet mechanism be rotated, for example, within a range of 90 degrees.

Third Embodiment

Figure 10:
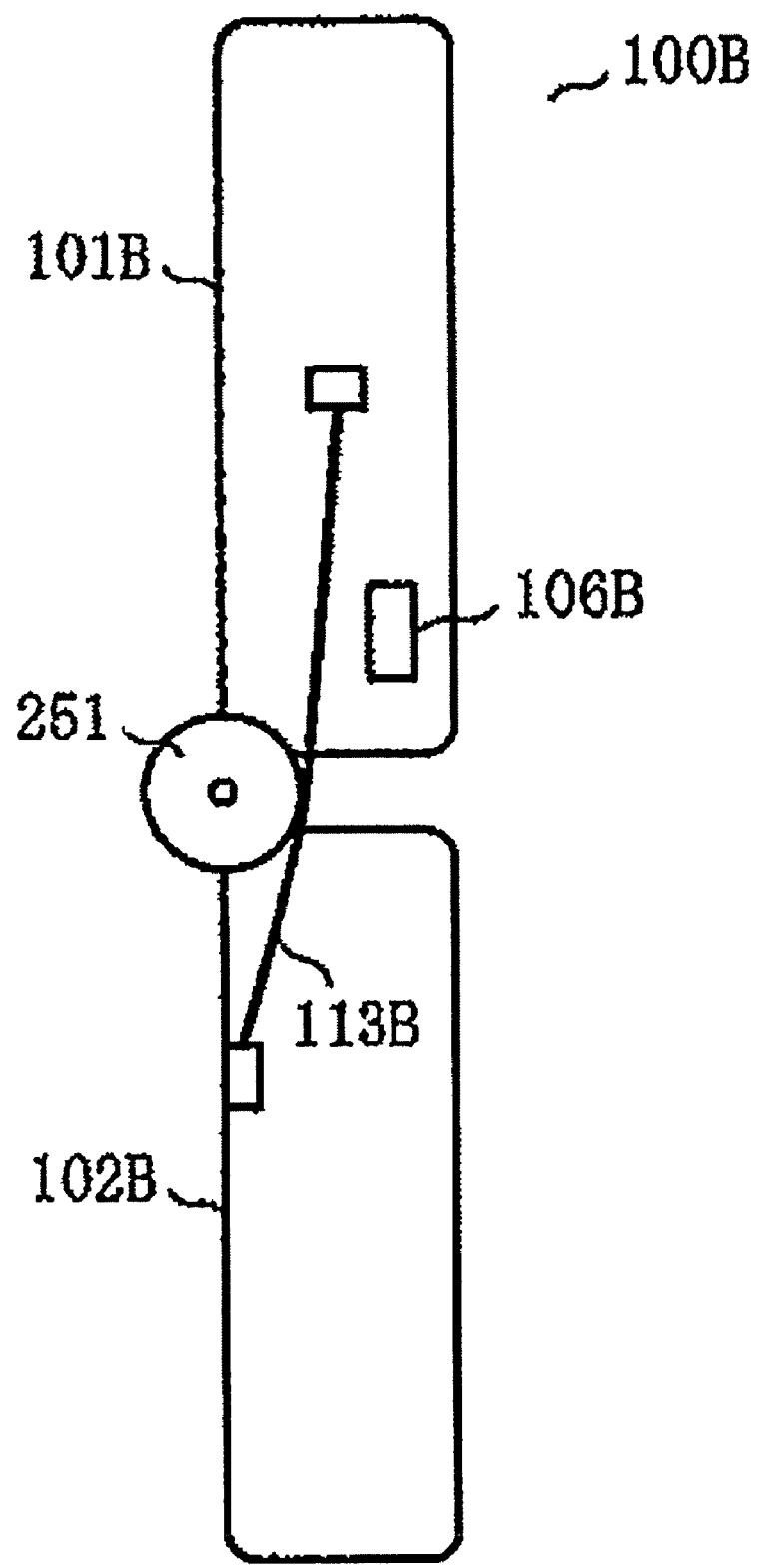
FIG. 10 is a side view of configurations showing principles of a mobile phone according to a third embodiment of the present invention.

FIG. 10 is a diagram of configurations showing principles of a mobile phone of the third embodiment of the present invention.

According to the third embodiment, an unillustrated electricity generating unit having the same configurations as in the above embodiments is provided in the first flip 101B of the foldable mobile phone 100B and one end of the pull line 113B is fixed. The pull line 113B comes into contact with an outer circumference of a roller (not shown) mounted on a hinge mechanism (not shown) and further passes through the inside of the second flip 102B and its another end is secured in a specified position.

Figure 11:
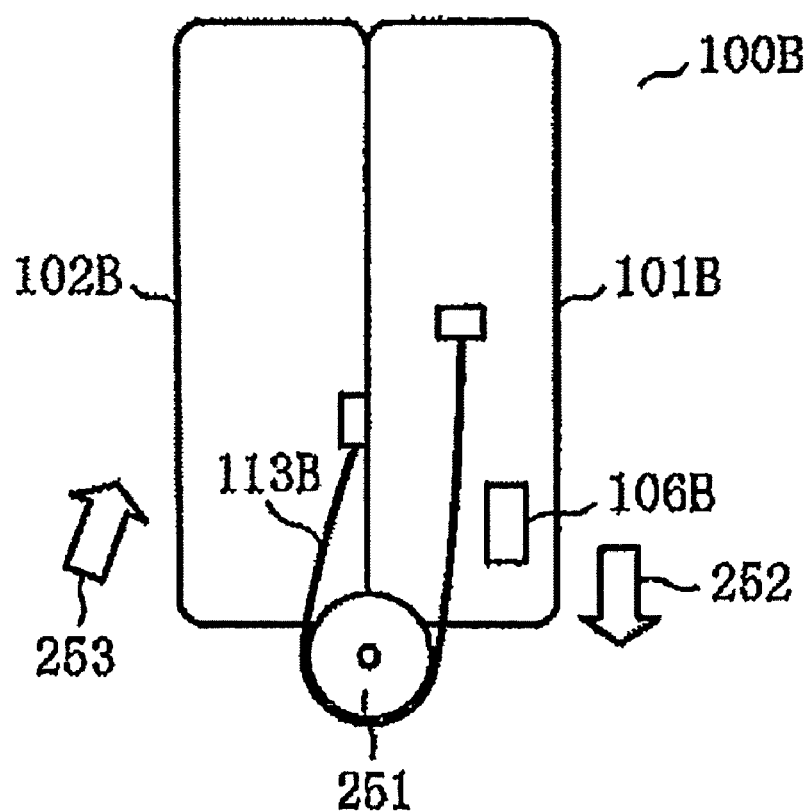
FIG. 11 is a side view showing principles of the mobile phone of the third embodiment in a state where its flips are closed.

FIG. 11 shows a state in which the flips of the mobile phone are closed. When the mobile phone 100B changes from its opened state to its closed state, the roller 251 moves in synchronization with movements of the pull line 113B in directions of the arrows 252 and 253 and then rotates. The rotation of the roller 251 causes a spiral spring (not shown) to be wound up via a ratchet mechanism (not shown). The mobile phone 100B is also provided with an excess winding prevention latch.

In the mobile phone 100B of the third embodiment, every time when a user ordinarily opens or closes the first flip 101B and the second flip 102B, the spiral spring is wound up little by little. Therefore, when an unillustrated chargeable battery reaches exhaustion, electricity generation is possible for some minutes, which a user can finish urgent work using the mobile phone 100B. It is needless to say that the user can fully wind up a spiral spring by repeating the opening or closing of the first flip 101B and second flip 102B.

In each of the embodiments described above, examples in which the mobile phones are employed are described, however, it is natural that the present invention can be applied to all portable electronic devices comparatively less consuming power. Further, the number of gears to transfer torque of a spiral spring and/or a type of transferring mechanism used to transfer the torque to a motor are not limited to each of the embodiments described above.

The invention claimed is:

1. A portable electronic device comprising:
   a spiral spring made of a band-like elastic body wound around spirally;
   an external force applying unit to allow an external force to act to wind up the spiral spring and to make the spiral spring accumulate mechanical energy;
   an electricity generating unit to generate electricity by torque occurring when the spiral spring is released;
   a power consuming component to receive power at a specified rated voltage;
   a rechargeable battery embedded;
   a constant voltage adjusting unit to adjust so that the power generated and supplied by the electricity generating unit has the specified rated voltage; and
   a switch to selectively apply the specified rated voltage adjusted by the constant voltage adjusting unit and a voltage outputted from the rechargeable battery to the power consuming component.

2. The portable electronic device according to claim 1, wherein the voltage adjusting unit is provided with a smoothing circuit to smooth an outputted voltage.

3. The portable electronic device according to claim 1, wherein the external force applying unit comprises a pulley connected to a rotation axis to wind up the spiral spring, a thread wound around the pulley a plurality of times in a state in which an external force applied by the external force applying unit does not act, and a hooking tool attached to one end of the thread to pull out the thread in a direction of untying the thread when the spiral spring is wound up.

4. The portable electronic device according to claim 1, wherein an external force applied by the external force applying unit is an external force acting when a connecting portion to connect two flips is rotated in a specified direction.

5. The portable electronic device according to claim 1, wherein an external force applied by the external force applying unit is an external force acting when an opening and closing portion to open or close two flips is opened or closed.

6. The portable electronic device according to claim 1, wherein the electricity generating unit comprises a motor to generate electricity and a torque transferring unit to transfer increased torque and speed occurring when the spiral spring is released to the motor and further comprises a latching unit disposed so as to freely advance or retreat in a convex and concave portion to pivot a pivoting component so that transferring of torque by the pivoting component making up the torque transferring unit is temporarily stopped.

7. The portable electronic device according to claim 1, wherein the switch to select and output a voltage outputted by the constant voltage adjusting unit when a voltage outputted by the constant voltage adjusting unit is higher than a voltage of the embedded rechargeable battery.

* * * * *